United States Patent
Saito

(10) Patent No.: US 10,071,650 B2
(45) Date of Patent: Sep. 11, 2018

(54) METHOD OF PREVENTING FUEL GAS FROM ENTERING CABIN OF MOBILE OBJECT INCLUDING FUEL CELL AND MOBILE OBJECT INCLUDING FUEL CELL

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/923,918

(22) Filed: Oct. 27, 2015

(65) Prior Publication Data
US 2016/0137029 A1 May 19, 2016

(30) Foreign Application Priority Data
Nov. 14, 2014 (JP) .................................. 2014-231666

(51) Int. Cl.
*B60L 11/18* (2006.01)
*B60H 1/00* (2006.01)

(52) U.S. Cl.
CPC .......... *B60L 11/1881* (2013.01); *B60H 1/008* (2013.01); *B60H 1/00849* (2013.01); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 5,839,421 A | * | 11/1998 | Suzuki | B60H 1/3208 123/698 |
| 5,971,844 A | * | 10/1999 | Samukawa | B60H 1/008 454/139 |
| 2003/0044660 A1 | | 3/2003 | Motoyama et al. | |
| 2008/0081231 A1 | | 4/2008 | Kurita et al. | |

FOREIGN PATENT DOCUMENTS

| | | | | |
|---|---|---|---|---|
| CN | 202271928 U | | 6/2012 | |
| JP | 55051616 A | * | 4/1980 | |
| JP | H09-202131 A | | 8/1997 | |
| JP | 2003-077510 A | | 3/2003 | |
| JP | 3441466 B2 | * | 9/2003 | |
| JP | 2004-166488 | | 6/2004 | |
| JP | 2004268792 A | * | 9/2004 | B60H 1/00785 |
| JP | 2005-347198 A | | 12/2005 | |
| JP | 2008-084730 A | | 4/2008 | |

(Continued)

*Primary Examiner* — Shelley Chen
(74) *Attorney, Agent, or Firm* — Finnegan, Henderson, Farabow, Garrett & Dunner, LLP

(57) ABSTRACT

A mobile object comprising: a fuel cell; an cabin that is separated from an installing space where the fuel cell is located; an air conditioning device performs an air conditioning of the cabin; a controller controls an operation of the air conditioning device; and a gas concentration detection unit that is installed in the installing space and detects a concentration of gas of a same type as fuel gas supplied to the fuel cell. The controller switches an operation mode of the air conditioning device to an internal air circulation mode from another mode when the concentration of the gas is equal to or higher than a predetermined upper-limit threshold.

6 Claims, 2 Drawing Sheets

(56) References Cited

FOREIGN PATENT DOCUMENTS

| | | |
|---|---|---|
| JP | 2008-260485 A | 10/2008 |
| JP | 2011-119080 A | 6/2011 |
| JP | 2012-187987 A | 10/2012 |
| JP | 2014-086171 A | 5/2014 |
| JP | 2014-151682 A | 8/2014 |
| KR | 10-2013-0141114 A | 12/2013 |
| KR | 10-2014-0084642 A | 7/2014 |

* cited by examiner

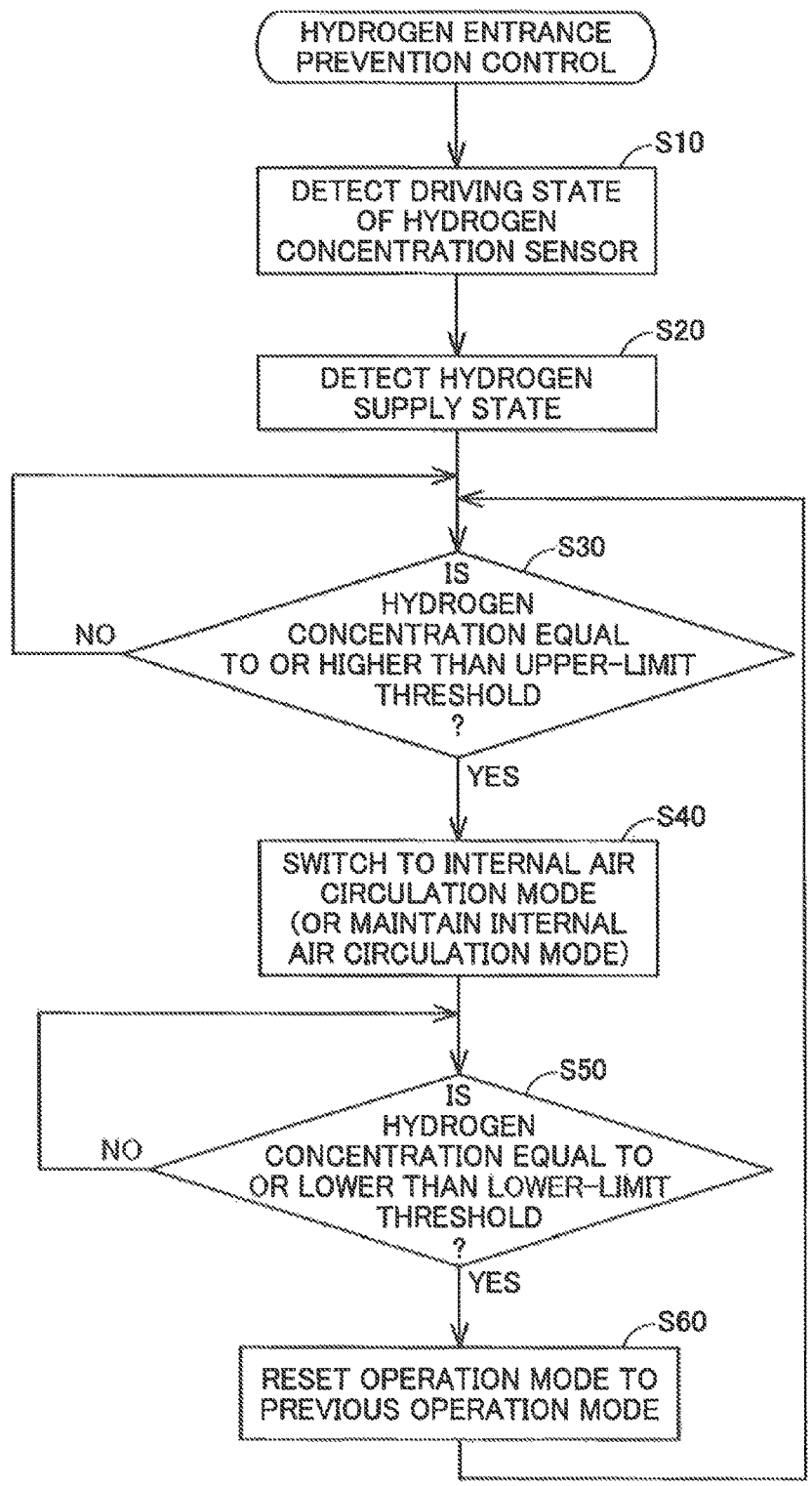

METHOD OF PREVENTING FUEL GAS FROM ENTERING CABIN OF MOBILE OBJECT INCLUDING FUEL CELL AND MOBILE OBJECT INCLUDING FUEL CELL

CROSS-REFERENCE TO RELATED APPLICATION

The present application claims priority to Japanese Patent Application No. (JP) 2014-231666 filed on Nov. 14, 2014, the contents of which are incorporated herein by reference.

BACKGROUND

Field

The present invention relates to a method of preventing fuel gas from entering a cabin of a mobile object including a fuel cell and to a mobile object including a fuel cell.

Related Art

A polymer electrolyte fuel cell, hereinafter also simply referred to as "fuel cell", generates power through an electrochemical reaction between hydrogen as fuel gas and oxygen as oxidant gas. In a fuel cell vehicle including the fuel cell, a technique for preventing hydrogen, which erroneously leaked from a path for supplying the hydrogen to the fuel cell or a path for discharging the hydrogen from the fuel cell, from entering a passenger cabin is proposed as disclosed in JP2004-166488A, for example.

However, in the above-mentioned publication, processing is described that is executed to prevent the hydrogen from further entering the passenger cabin only after the hydrogen entering the passenger cabin of the fuel cell vehicle is detected, and no processing for proactively preventing the entrance of the hydrogen is mentioned. As described above, a technique of preventing fuel gas from entering a passenger cabin for a passenger in a fuel cell vehicle as well as other mobile objects including the fuel cell, has a room for improvement.

SUMMARY

In order to solve at least part of the problem described above in a mobile object including a fuel cell, the present invention may be implemented in the aspects described below.

(1) According to a first aspect of the present invention, a method of preventing, in a mobile object including a passenger cabin air conditioned by an air conditioning device and a fuel cell located in an installing space that is separated from the passenger cabin, fuel gas of the fuel cell from entering the passenger cabin is provided. The method may include a concentration detection step and an operation mode control step. The concentration detection step may detect a concentration of gas of a same type as the fuel gas in the installing space. The operation mode control step may execute, when the concentration of the gas is equal to or higher than a predetermined upper-limit threshold, (i) processing of switching an operation mode of the air conditioning device to an internal air circulation mode, which takes in the air from the passenger cabin and returns the resultant air to the passenger cabin, or (ii) processing of maintaining the internal air circulation mode when the air conditioning device is in the internal air circulation mode. With the method according to this aspect, entering of the fuel gas into the passenger cabin through the air conditioning device is prevented, when the increase in the concentration of the fuel gas is detected in the installing space outside the passenger cabin.

(2) In the method according to the above-described aspect, the operation mode control step may further include an operation mode resetting step which is performed after executing the processing of switching the operation mode of the air conditioning device. The operation mode resetting step may turn the operation mode of the air conditioning device back to a previous operation mode, which is switched to the internal air circulation mode, when the concentration of the gas is equal to or lower than a predetermined lower-limit threshold. With the method according to this aspect, the operation mode of the air conditioning device is automatically reset to the operation mode before being switched to the internal air circulation mode when the concentration of the fuel gas decreases. Therefore, a convenience for a user of the mobile object is enhanced.

(3) In the method according to the above-described aspect, the operation mode control step may be executed while the fuel cell is generating power. With the method according to this aspect, entering of the fuel gas into the passenger cabin through the air conditioning device is prevented while the fuel cell is generating power.

(4) According to a second aspect of the present invention, a mobile object is provided. The mobile object according to this aspect may include a fuel cell, a passenger cabin, an air conditioning device, a controller, and a gas concentration detection unit. The passenger cabin may be separated from an installing space where the fuel cell is located. The air conditioning device may perform an air conditioning of the passenger cabin. The controller may control an operation of the air conditioning device. The gas concentration detection unit may be installed in the installing space and detect a concentration of gas of a same type as fuel gas supplied to the fuel cell. The controller may execute operation mode control that executes, when the concentration of the gas is equal to or higher than a predetermined upper-limit threshold, (i) processing of switching an operation mode of the air conditioning device to an internal air circulation mode, which takes in the air from the passenger cabin and returns the resultant air to the passenger cabin, from another mode, or (ii) processing of maintaining the internal air circulation mode when the air conditioning device is in the internal air circulation mode. With the mobile object according to this aspect, entering of the fuel gas into the passenger cabin through the air conditioning device is prevented.

(5) In the mobile object according to the above-described aspect, the controller further may execute, after executing the processing of switching the operation mode of the air conditioning device in the operation mode control, processing of turning the operation mode of the air conditioning device to an previous operation mode, which is switched to the internal air circulation mode, when the concentration of the gas is equal to or lower than a predetermined lower-limit threshold. With the mobile object according to this aspect, the operation mode of the air conditioning device is automatically reset to the operation mode before being switched to the internal air circulation mode when the concentration of the fuel gas decreases. Therefore, a convenience for a user of the mobile object is enhanced.

(6) In the mobile object according to the above-described aspect, the controller may execute the operation mode control while the fuel cell is generating power. With the mobile object according to this aspect, entering of the fuel gas into the passenger cabin through the air conditioning device is prevented while the fuel cell is generating power.

It should be noted that not all of a plurality of components in each aspect of the present invention described above are essential, and part of the plurality of components may be changed, omitted, or replaced with other components, and part of the limitations may be omitted as appropriate in order to partially or entirely solve the problem described above or to partially or entirely achieve the advantageous effects described herein. Part or whole of the technical features in one aspect of the present invention described above may be combined with part or whole of the technical features in another aspect of the present invention described above to make an independent aspect of the present invention in order to partially or entirely solve the problem described above or to partially or entirely achieve the advantageous effects described herein.

The present invention may be implemented in various modes other than the method of preventing fuel gas from entering or the mobile object. For example, The present invention may be implemented in such modes as a method for controlling a mobile object or a fuel cell system, a method for controlling an air conditioning device, a computer program for executing these control methods, and a non-transitory recording medium recording the computer program. The present invention may also be implemented in such modes as a method for controlling a concentration of fuel gas in a passenger cabin of a mobile object including a fuel cell.

BRIEF DESCRIPTION OF THE DRAWINGS

FIG. 2 is a flowchart of hydrogen entrance prevention control;

DESCRIPTION OF THE EMBODIMENTS

A. Embodiment

Figure 1:
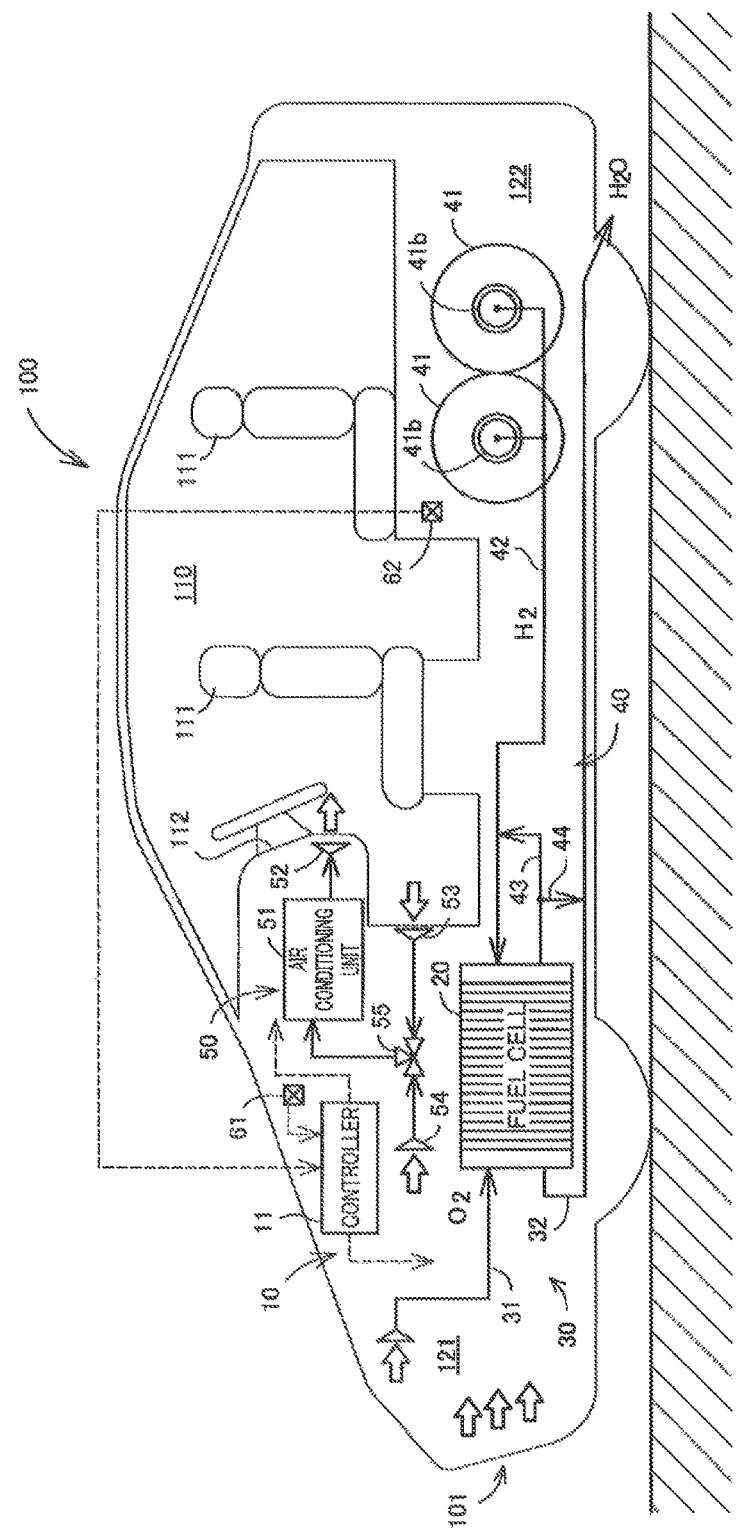
FIG. 1 is a schematic view of a configuration of a fuel cell vehicle.

FIG. 1 is a schematic view of a configuration of a fuel cell vehicle 100 according to a first embodiment of the present invention. The fuel cell vehicle 100 is one embodiment of a mobile object, and travels by using power generated by a fuel cell 20 as a driving source. The fuel cell vehicle 100 has a vehicle internal space including a vehicle interior 110, a front space 121, and a lower space 122. The vehicle interior 110 is an internal space for a passenger of the fuel cell vehicle 100 including a driver, and is provided with a seat 111 and an instrument panel 112 provided with an interface used for operation control. The vehicle interior 110 correspond to a subordinate concept of a cabin in the present invention.

The front space 121 is a space provided on a front side of the vehicle interior 110. The lower space 122 is a space provided on a lower side of the vehicle interior 110. The front space 121 and the lower space 122 are in spatial communication with each other in a front and rear direction. In this specification, the description related to directions such as "right", "left", "front", "rear", "upper", and "lower" is based on directions as viewed from the driver on the fuel cell vehicle 100.

The fuel cell vehicle 100 includes a fuel cell system 10 and an air conditioning device 50. The fuel cell system 10 is disposed in both the front space 121 and the lower space 122. In the present embodiment, the front space 121 and the lower space 122 correspond to a subordinate concept of an installing space in the present invention. The fuel cell system 10 includes a controller 11, the fuel cell 20, a cathode gas supply and exhaust unit 30, and an anode gas supply and exhaust circulation unit 40.

A controller 11 is formed of a microcomputer including a central processing unit and a main storage device, and loads a program onto the main storage device and executes the program to implement various functions. While the fuel cell system 10 is in operation, the controller 11 controls the components described below, and thus executes operation control of causing the fuel cell 20 to generate power in accordance with an output request. The controller 11 further executes hydrogen entrance prevention control to prevent hydrogen from entering the vehicle interior 110, and controls an operation mode of the air conditioning device 50 in the hydrogen entrance prevention control. The hydrogen entrance prevention control and the control for the operation mode control of the air conditioning device 50 performed by the controller 11 are described later.

The fuel cell 20 is a polymer electrolyte fuel cell that generates power with reaction gas including hydrogen as fuel gas and oxygen as oxidant gas supplied thereto. A disposed position and a disposed direction of the fuel cell 20 are not particularly limited.

The cathode gas supply and exhaust unit 30 has a function of supplying compressed air, as cathode gas, to the fuel cell 20, and a function of discharging cathode exhaust gas and exhaust water from the cathode of the fuel cell 20. The cathode gas supply and exhaust unit 30 includes a cathode gas pipe 31 and a cathode exhaust gas pipe 32.

The cathode gas pipe 31 is connected to an inlet of a gas flow path on a cathode side of the fuel cell 20. The cathode gas pipe 31 guides outer air, taken into the front space 121 through a grill 101 on the front side of the fuel cell vehicle 100, to a cathode of the fuel cell 20. The cathode gas pipe 31 includes an air compressor that compresses the outer air thus taken in, an on-off valve with which a flow of the compression air to the fuel cell 20 is controlled, and the like, which are not illustrated in the figure.

The cathode exhaust gas pipe 32 is connected to an outlet of the gas flow path on the cathode side of the fuel cell 20. The cathode exhaust gas pipe 32 is disposed on a lower side in the lower space 122 and extends from a front portion to a rear portion of the fuel cell vehicle 100. The cathode exhaust gas pipe 32 guides the exhaust gas and exhaust water, discharged from the fuel cell 20, to the outside of the fuel cell vehicle 100. The cathode exhaust gas pipe 32 is provided with an unillustrated pressure regulating valve with which back pressure on the cathode side of the fuel cell 20 is adjusted.

The anode gas supply and exhaust circulation unit 40 has a function of supplying high-pressure hydrogen, as anode gas, to the fuel cell 20. The anode gas supply and exhaust circulation unit 40 further has a function of causing the anode exhaust gas and the exhaust water to be discharged from the fuel cell 20, and a function of causing hydrogen in the anode exhaust gas to be circulated to the anode of the fuel cell 20. The anode gas supply and exhaust circulation unit 40 includes a hydrogen tanks 41, an anode gas pipe 42, an anode exhaust gas circulation pipe 43, and an anode water discharge pipe 44.

The hydrogen tank 41 is filled with high-pressure hydrogen to be supplied to the fuel cell 20. The hydrogen tank 41 is disposed on the rear side of the fuel cell vehicle 100 in the lower space 122. A main stop valve 41b that opens and closes under the control of the controller 11 is attached to a mouthpiece portion of the hydrogen tank 41. The anode gas pipe 42 connects between the hydrogen tank 41 and an inlet of the gas flow path on the anode side of the fuel cell 20. The anode gas pipe 42 is provided with a regulator that controls pressure and a flow rate of the hydrogen and an injector, which are not illustrated in the figure.

The anode exhaust gas circulation pipe 43 connects between the anode gas pipe 42 and an outlet of the gas flow path on the anode side of the fuel cell 20. The anode exhaust gas circulation pipe 43 is provided with a gas-liquid separator and a circulation pump, which are not illustrated in the figure. The anode water discharge pipe 44 is connected to the cathode exhaust gas pipe 32 in such a manner as to enable the exhaust water, as a result of gas-liquid separation in the anode exhaust gas circulation pipe 43, to be discharged outside the fuel cell vehicle 100. The anode water discharge pipe 44 is provided with a water discharge valve, which is not illustrated, for controlling water discharge timing.

The fuel cell system 10 includes at least the following components in addition to the components illustrated in the figure. The fuel cell system 10 includes a coolant supply unit that controls a temperature of the fuel cell 20 by supplying a coolant to the fuel cell 20. The fuel cell system 10 further includes: a secondary battery that stores power output from the fuel cell 20 and regenerative power and functions as a power source together with the fuel cell 20; a DC/DC converter that controls voltage of the fuel cell 20 and charging and discharging of the secondary battery; and the like.

The air conditioning device 50 executes air conditioning processing of adjusting the temperature in the vehicle interior 110. The air conditioning device 50 is disposed in the front space 121. The air conditioning device 50 includes an air conditioning unit 51, an air blowing unit 52, a first air inlet port 53, a second air inlet port 54, and a switching unit 55. The air conditioning unit 51 includes an evaporator and a capacitor, and adjusts the temperature of the air taken in through the first air inlet port 53 and the second air inlet port 54 in accordance with the temperature designated by the passenger, by using the outer air and the exhaust heat from the fuel cell 20. The air blowing unit 52 blows the air, with the temperature adjusted by the air conditioning unit 51, into the vehicle interior 110 in an amount designated by the passenger.

The air is taken in the vehicle interior 110 through the first air inlet port 53. The outer air that has entered the front space 121 through the grill 101 is taken in through the second air inlet port 54. For example, the switching unit 55 includes a three-way valve or a butterfly damper mechanism having the same function as the three-way valve, and is connected to the air conditioning unit 51, the first air inlet port 53, and the second air inlet port 54. The air conditioning device 50 has a function of switching between an internal air circulation mode and an outer air introducing mode, through a connected direction switching operation by the switching unit 55. In the internal air circulation mode, the temperature of the air in the vehicle interior 110 is adjusted and the resultant air is returned to the vehicle interior 110. In the outer air introducing mode, the air with the temperature adjusted is introduced into the vehicle interior 110. The switching unit 55 sets the first air inlet port 53 and the second air inlet port 54 to be the source of air supplied to the air conditioning unit 51 respectively in the internal air circulation mode and in the outer air introducing mode.

In a normal state, the air conditioning device 50 operates in accordance with an operation made by the passenger on an operation unit, which is not illustrated, provided to the vehicle interior 110. The passenger on the fuel cell vehicle 100 is allowed to designate, through the operation unit, the temperature and the amount of air blown into the vehicle interior 110 from the air blowing unit 52 of the air conditioning device 50. The passenger is allowed also to switch between the outer air introducing mode and the internal air circulation mode through the operation unit. The air conditioning device 50 according to the present embodiment is also switched between the outer air introducing mode and the internal air circulation mode under an instruction from the controller 11 of the fuel cell system 10.

The fuel cell vehicle 100 includes a first hydrogen concentration sensor 61 in the front space 121 and a second hydrogen concentration sensor 62 in the lower space 122. The first hydrogen concentration sensor 61 is disposed at a position, in an upper portion of the front space 121, close to the vehicle interior 110. The second hydrogen concentration sensor 62 is disposed at a position, in the lower space 122, close to the main stop valve 41b of the hydrogen tank 41. The first hydrogen concentration sensor 61 and the second hydrogen concentration sensor 62 correspond to a subordinate concept of a gas concentration detection unit in the present invention.

The first hydrogen concentration sensor 61 and the second hydrogen concentration sensor 62 each detect hydrogen at the respective disposed positions, and output a signal indicating a hydrogen concentration to the controller 11. In the hydrogen entrance prevention control described below, the controller 11 controls the air conditioning device 50 based on the hydrogen concentrations detected by the first hydrogen concentration sensor 61 and the second hydrogen concentration sensor 62, and executes processing of preventing the hydrogen from entering the vehicle interior 110.

FIG. 2 is a flowchart illustrating the hydrogen entrance prevention control executed by the controller 11. When the driver of the fuel cell vehicle 100 performs an ignition operation, the controller 11 starts the fuel cell system 10 and starts operation control of the fuel cell 20, and starts the hydrogen entrance prevention control in parallel.

Steps S10 and S20 correspond to initial processing executed when the fuel cell vehicle 100 is started. In step S10, the controller 11 detects that the first hydrogen concentration sensor 61 and the second hydrogen concentration sensor 62 are in a normal driving state upon acquiring test signals from the first hydrogen concentration sensor 61 and the second hydrogen concentration sensor 62. When the controller 11 fails to normally acquire the test signals from the first hydrogen concentration sensor 61 and the second hydrogen concentration sensor 62 due to a broken wire or the like, the controller 11 notifies the driver of the failure through an unillustrated indicator on the instrument panel 112.

In step S20, the controller 11 detects that hydrogen is normally supplied from the anode gas supply and exhaust circulation unit 40 to the fuel cell 20. More specifically, the controller 11 detects that there is no failure such as sticking of the main stop valve 41b in the hydrogen tank 41. Furthermore, the controller 11 detects that hydrogen has successfully reached the fuel cell 20 upon detecting a rise in the current in the fuel cell 20 after the hydrogen starts to be supplied to the fuel cell 20. Upon failing to detect that the hydrogen is normally supplied, the controller 11 notifies the driver of the failure, and stops the operation of the fuel cell system 10.

After the initial processing in steps S10 and S20, the controller 11 starts processing of monitoring the hydrogen concentration in the front space 121 and in the lower space 122. While the fuel cell system 10 is in operation, the controller 11 periodically acquires detection signals from the first hydrogen concentration sensor 61 and the second hydrogen concentration sensor 62. The step of detecting the hydrogen concentration with the first hydrogen concentration sensor 61 and the second hydrogen concentration sensor 62 corresponds to a subordinate concept of a concentration detection step in the present invention. Every time the detection signals are acquired from the first hydrogen concentration sensor 61 and the second hydrogen concentration sensor 62, the controller 11 determines whether the hydrogen concentration detected from the detection signal is equal to or higher than a predetermined upper-limit threshold in step S30. As the upper-limit threshold of the hydrogen concentration, a maximum allowable hydrogen concentration in a closed space, for example, 3% may be set.

When any one of the hydrogen concentrations detected by the first hydrogen concentration sensor 61 and the second hydrogen concentration sensor 62 is lower than the upper-limit threshold, as shown by NO arrow in step S30, the controller 11 continues to monitor the hydrogen concentration with the first hydrogen concentration sensor 61 and the second hydrogen concentration sensor 62. When at least one of the hydrogen concentrations detected by the first hydrogen concentration sensor 61 and the second hydrogen concentration sensor 62 is equal to or higher than the upper-limit threshold, as shown by YES arrow in step S30, the controller 11 executes processing in step S40. In step S40, when the operation mode of the air conditioning device 50 is not the internal air circulation mode, the controller 11 switches the operation mode of the air conditioning device 50 to the internal air circulation mode. On the other hand, when the operation mode of the air conditioning device 50 is the internal air circulation mode, the controller 11 makes the air conditioning device 50 stay in the internal air circulation mode. When the hydrogen concentration is high in the front space 121 or the lower space 122, the air conditioning device 50 operates in the internal air circulation mode. Thus, the hydrogen in the front space 121 and the lower space 122 is prevented from entering the vehicle interior 110 by the operation of the air conditioning device 50. Thus, the hydrogen concentration in the vehicle interior 110 is prevented from increasing. This processing step in step S40 corresponds to a subordinate concept of an operation mode control step in the present invention. Control of executing the processing in step S40 corresponds to a subordinate concept of operation mode control in the present invention. In step S40, the controller 11 further executes processing of reducing the hydrogen concentration in the front space 121 and the lower space 122, such as processing of closing the main stop valve 41b of the hydrogen tank 41.

In step S40, the controller 11 may further execute processing of reducing the air flow from the air conditioning device 50 and processing of stopping blowing air to the vehicle interior 110, in addition to the processing of switching the operation mode to the internal air circulation mode. Thus, the hydrogen in the front space 121 and the lower space 122 is more effectively prevented from being taken into the vehicle interior 110. After switching the operation mode of the air conditioning device 50 to the internal air circulation mode, the controller 11 may control the air conditioning device 50 in such a manner that an operation of switching the operation mode of the air conditioning device 50 by the passenger becomes ineffective. Thus, the proactive processing executed by the controller 11 is prevented from being meaningless. Furthermore, in step S40, the controller 11 may execute processing of informing the passenger that the hydrogen concentration outside the vehicle interior 110 is high and thus the proactive processing for preventing the hydrogen from entering the vehicle interior 110 is being executed.

After step S40, the controller 11 transitions to the mode of monitoring the reduction in the hydrogen concentration in the front space 121 and the lower space 122. The controller 11 periodically acquires the detection signals from the first hydrogen concentration sensor 61 and the second hydrogen concentration sensor 62, and determines whether any one of the hydrogen concentration indicated by the detection signals is equal to or lower than a predetermined lower-limit threshold in step S50. The lower-limit threshold of the hydrogen concentration may be set to such a value that the hydrogen concentration in the vehicle interior 110 does not exceed 1%, even when the air in the front space 121 and the lower space 122 is taken into the vehicle interior 110. The lower-limit threshold of the hydrogen concentration may be set to 0.85% for example.

The controller 11 continues to monitor the hydrogen concentration when at least one of the hydrogen concentrations in the front space 121 and the lower space 122 is higher than the lower-limit threshold, as shown by NO arrow in step S50. On the other hand, the controller 11 switches the air conditioning device 50 to the operation mode before transitioning to the internal air circulation mode in step S60 when the hydrogen concentrations in both the front space 121 and the lower space 122 are equal to or lower than the lower-limit threshold, as shown by YES arrow in step S50. In step S40, the controller 11 stores information indicating the operation mode before transitioning to the internal air circulation mode in advance in the main storage device or the like, and in step S60 reads the stored information and controls the operation mode. When the air conditioning device 50 is in the outer air introducing mode before the processing in step S40 is executed, the controller 11 makes the air conditioning device 50 switch to the outer air introducing mode. When the air conditioning device 50 is in the internal air circulation mode before the processing in step S40 is executed, the controller 11 makes the air conditioning device 50 stay in the internal air circulation mode. The processing in step S60 corresponds to a subordinate concept of operation mode resetting processing in the present invention.

In the fuel cell vehicle 100 according to the present embodiment, when the hydrogen concentration in the vehicle interior 110 is no longer likely to increase, the air conditioning device 50 automatically returns to the original operation state, without requiring an operation of the passenger. Thus, the convenience for the passenger of the mobile object is enhanced. In step S60, the controller 11 may not only reset the operation mode, but also reset an operation condition of the air conditioning device 50. The controller 11 may store information indicating the operation condition such as air flow from the air conditioning device 50 in step S40, and may reset the operation condition to the stored operation condition in step S60. After step S60, the controller 11 continues to monitor the hydrogen concentration in the front space 121 and the lower space 122, as long as the fuel cell system 10 is in operation.

As described above, in the fuel cell vehicle 100 according to the present invention, the operation mode of the air conditioning device 50 is controlled based on the hydrogen concentration detected in the front space 121 and the lower space 122 outside the vehicle interior 110. Thus, even when the hydrogen leaks from the front space 121 and the lower space 122, entering of the hydrogen into the vehicle interior 110 is proactively prevented before the hydrogen concentration in the vehicle interior 110 rises. The operation mode of the air conditioning device 50 forcibly achieved to prevent the hydrogen from entering the vehicle interior 110 is automatically reset to the original operation mode when the hydrogen concentration in the vehicle interior 110 is no longer likely to rise. Thus, the higher user friendliness for the passengers is achieved.

B. Modifications

B1. Modification 1:

In the embodiment described above, the hydrogen entrance prevention control of preventing the hydrogen from entering the vehicle interior 110 is executed in the fuel cell vehicle 100. Alternatively, the hydrogen entrance prevention control according to the embodiment described above may be executed in a mobile object including a fuel cell other than the fuel cell vehicle 100. For example, the hydrogen entrance prevention control may be executed to prevent hydrogen from entering a passenger cabinet in a train including a fuel cell.

B2. Modification 2:

In the embodiment described above, the fuel cell vehicle 100 includes the first hydrogen concentration sensor 61 in the front space 121 and the second hydrogen concentration sensor 62 in the lower space 122. Alternatively, in the fuel cell vehicle 100, any one of the first hydrogen concentration sensor 61 and the second hydrogen concentration sensor 62 may be omitted. The disposed positions of the first hydrogen concentration sensor 61 and the second hydrogen concentration sensor 62 are not limited to those described in the embodiment described above. For example, the first hydrogen concentration sensor 61 may be disposed near the fuel cell 20. The hydrogen concentration sensors may be disposed in an air flow path of the air conditioning device 50. The hydrogen concentration sensors may be disposed at any position outside the vehicle interior 110.

B3. Modification 3:

In the embodiment described above, the upper-limit threshold of the hydrogen concentration is set to be the same between the front space 121 and the lower space 122. Alternatively, the upper-limit threshold of the hydrogen concentration may be set to be different between the front space 121 and the lower space 122. The upper-limit threshold of the lower space 122, including the hydrogen tank 41, may be set to be lower than that of the front space 121. Alternatively, the upper-limit threshold of the front space 121, including the second air inlet port 54 of the air conditioning device 50, may be set to be lower than that of the lower space 122. In the embodiment described above, the controller 11 switches the operation mode of the air conditioning device 50 when the hydrogen concentration in at least one of the front space 121 and the lower space 122 becomes equal to or higher than the upper-limit threshold. Alternatively, the controller 11 may switch the operation mode of the air conditioning device 50 when both of the hydrogen concentrations in the front space 121 and the lower space 122 become equal to or higher than the upper-limit threshold.

B4. Modification 4:

In the embodiment described above, the controller 11 resets the operation mode of the air conditioning device 50 that has been switched to the internal air circulation mode by the controller 11 in step S40, to the original operation mode in step S60. Alternatively, the processing of resetting the operation mode by the controller 11 in the step S60 may be omitted.

B5. Modification 5:

In the fuel cell vehicle 100 according to the embodiment described above, the hydrogen entrance prevention control is executed while the fuel cell 20 is generating power. Alternatively, the hydrogen entrance prevention control may be executed while the fuel cell 20 is not generating power. In this case, the fuel cell vehicle 100 execute the hydrogen entrance prevention control with power from the secondary battery.

B6. Modification 6:

In the fuel cell vehicle 100 according to the embodiment described above, the controller 11 controls the operations of the fuel cell system 10 and the air conditioning device 50. Alternatively, in the fuel cell vehicle 100, the controller 11 that may control the operation of the fuel cell system 10 and a controller that controls the operation of the air conditioning device 50 may be further provided, and the hydrogen entrance prevention control may be executed by the controller that controls the operation of the air conditioning device 50.

B7. Modification 7:

In the embodiment described above, the hydrogen entrance prevention control of preventing the hydrogen from entering the vehicle interior 110 is executed in the fuel cell vehicle 100 as a mobile object including the fuel cell as the power source. Alternatively, the hydrogen entrance prevention control may be executed in a mobile object other than the mobile object including the fuel cell as the power source. The hydrogen entrance prevention control may be executed in a vehicle including a hydrogen engine. Alternatively, control similar to the hydrogen entrance prevention control may be executed in a mobile object that uses gas other than hydrogen as fuel gas, as the control of preventing fuel gas from entering a passenger cabin of the mobile object. For example, in a vehicle using natural gas as the fuel gas, the control of preventing the natural gas from entering a passenger cabin may be executed.

B8. Modification 8:

In the embodiment described above, the switching unit 55 in the air conditioning device 50 includes the three-way valve or the damper mechanism. Alternatively, the switching unit 55 may use a different component to be capable of switching between the internal air circulation mode and the outer air introducing mode. The switching unit 55 may switch between the internal air circulation mode and the outer air introducing mode by switching opening/closing states of a valve with which a pipe of the first air inlet port 53 is opened/closed and a valve with which a pipe of the second air inlet port 54 is opened/closed.

The present invention is not limited to the embodiments, the examples, and the modifications described above, and may be implemented in various ways without departing from the gist of the present invention. For example, the technical features in the embodiments, the examples, the modifications corresponding to the technical features in each mode described in the summary section can be replaced or combined as appropriate in order to partially or entirely solve the problem described above or to partially or entirely achieve the advantageous effects described above. Some technical features that are not described as being essential herein can be omitted as appropriate. Part or whole of the functions and processing implemented by software in the embodiment and the modifications described above can be implemented by hardware. Likewise, part or whole of the functions and processing implemented by hardware in the embodiment and the modifications described above can be implemented by software. Examples of the hardware may include various types of circuits such as integrated circuits, discrete circuits, or circuit modules that are combinations of these circuits.

What is claimed is:

1. A method of preventing, in a mobile object including a cabin air conditioned by an air conditioning device and a fuel cell located in an installing space that is separated from the cabin, fuel gas of the fuel cell from entering the cabin, the method comprising:
   a concentration detection step that detects a concentration of gas of a same type as the fuel gas in the installing space;
   an operation mode control step that executes, when the concentration of the gas is equal to or higher than a predetermined upper-limit threshold,
   (i) processing of switching an operation mode of the air conditioning device to an internal air circulation mode, which takes in the air from the cabin and returns the resultant air to the cabin, from another mode, or
   (ii) processing of maintaining the internal air circulation mode when the air conditioning device is in the internal air circulation mode;
   an operation mode resetting step which is performed after executing the processing of switching the operation mode of the air conditioning device to the internal air circulation mode, the operation mode resetting step turning the operation mode of the air conditioning device back to a previous operation mode, which is switched to the internal air circulation mode, when the concentration of the gas is equal to or lower than a predetermined lower-limit threshold; and
   an operation cancellation step that controls the air conditioning device in such a manner that an operation of switching the operation mode of the air conditioning device by a passenger becomes ineffective after switching the operation mode of the air conditioning device to the internal air circulation mode in the operation mode control step.

2. The method in accordance with claim 1, wherein the operation mode control step is executed while the fuel cell is generating power.

3. A mobile object comprising:
   a fuel cell;
   a cabin that is separated from an installing space where the fuel cell is located;
   an air conditioning device performs an air conditioning of the cabin;
   a controller controls an operation of the air conditioning device; and
   a gas concentration detection unit that is installed in the installing space and detects a concentration of gas of a same type as fuel gas supplied to the fuel cell, wherein
   the controller executes an operation mode control that executes, when the concentration of the gas is equal to or higher than a predetermined upper-limit threshold,
   (i) processing of switching an operation mode of the air conditioning device to an internal air circulation mode, which takes in the air from the cabin and returns the resultant air to the cabin, from another mode, or
   (ii) processing of maintaining the internal air circulation mode when the air conditioning device is in the internal air circulation mode;
   the controller further executes, after executing the processing of switching the operation mode of the air conditioning device in the operation mode control, processing of turning the operation mode of the air conditioning device to a previous operation mode, which is switched to the internal air circulation mode, when the concentration of the gas is equal to or lower than a predetermined lower-limit threshold; and
   the controller further executes an operation cancellation that controls the air conditioning device in such a manner that an operation of switching the operation mode of the air conditioning device by a passenger becomes ineffective after switching the operation mode of the air conditioning device to the internal air circulation mode during execution of the operation mode control.

4. The mobile object in accordance with claim 3, wherein the controller executes the operation mode control while the fuel cell is generating power.

5. The method in accordance with claim 1, wherein the operation mode control step includes a storing step that stores a current operation mode of the air conditioning device in a storage before executing the processing of switching the operation mode of the air conditioning device to the internal air circulation mode.

6. The mobile object in accordance with claim 3, wherein the mobile object includes a storage, and the controller executes a process of storing a current operation mode of the air conditioning device in the storage before executing the processing of switching the operation mode of the air conditioning device to the internal air circulation mode.

* * * * *